June 6, 1933.   L. W. SAINE   1,913,246
SPLITPROOF TAPERED MACHINE JOINT PIPE
Filed Dec. 18, 1931   2 Sheets-Sheet 2
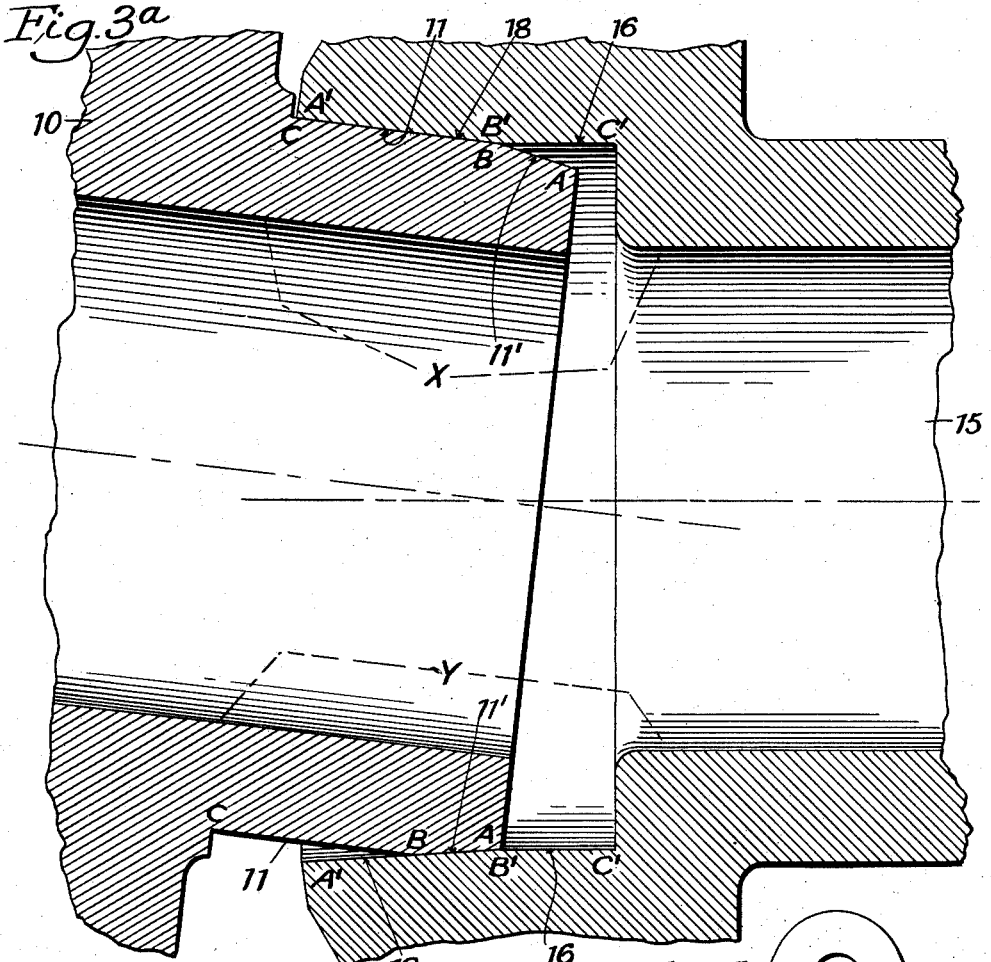
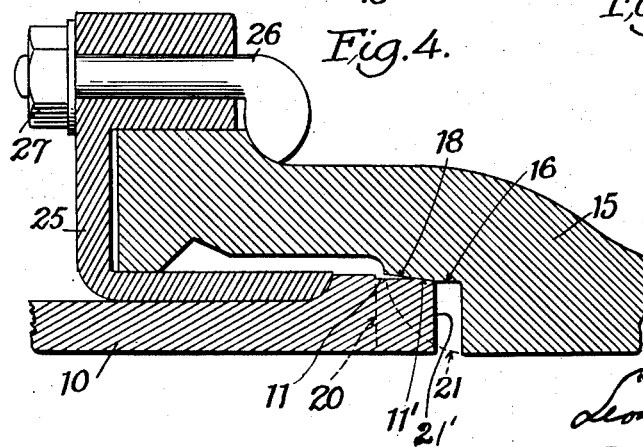
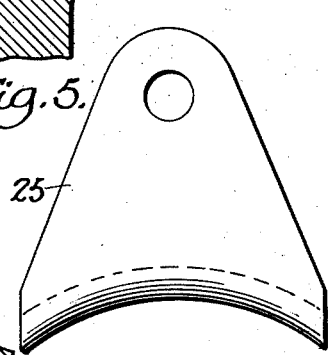

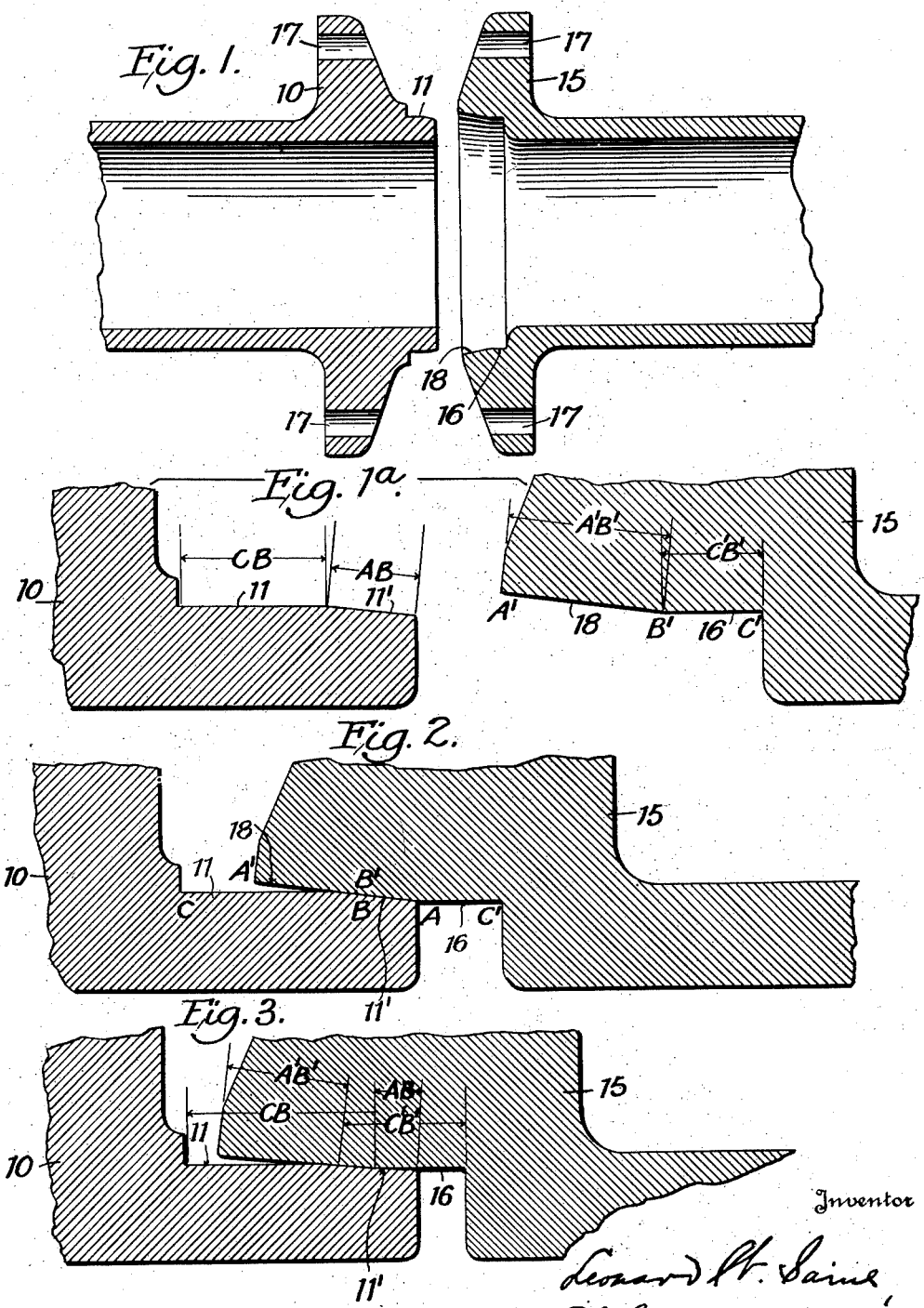

Patented June 6, 1933

1,913,246

UNITED STATES PATENT OFFICE

LEONARD W. SAINE, OF HEMPSTEAD, NEW YORK

SPLITPROOF TAPERED MACHINE JOINT PIPE

Application filed December 18, 1931. Serial No. 581,975.

This invention relates to tapered pipe joints and its object is to design, construct and shape the male or spigot and the female or hub members of the coupling so that a perfect fluid tight connection may be made without danger of splitting the female or hub member, definitely limiting the internal radial pressure in the hub, and by which construction it is possible for one or both of the members to be bent or deflected without impairing its fluid tight feature or causing the shearing of the male or spigot member.

These and other objects and details of the invention are more fully described in the following specification, and illustrated in the accompanying drawings, and sought to be defined by the claims, and wherein:—

Figure 1 is a sectional view of the two members of the improved pipe joint, separated;

Figure 1ª is an enlarged detail section;

Figure 2 is an enlarged detail section of said members, with the connection at first contact;

Figure 3 is an enlarged detail view of said members, with the connection in average finished contact;

Figure 3ª is a detail sectional view of said members, in deflection contact;

Figure 4 is a view of a section through an open enlarged hub and elongated spigot combined with a tapered formed joint on the end of the spigot and in the base of the hub;

Figure 5 is a face view of a form of clamp for use with the type of joint shown in Figure 4.

A tapered machined joint as heretofore commonly used in connection with cast iron pipe is well known and has been in successful use for many years. This commonly used type of joint is uniformly tight under pressure, flexible, easily and economically installed under ordinary conditions, but the matter of expansion has been troublesome. This commonly used type of joint consists of a female or hub end member machined to a continuous taper, usually 2½ degrees, and a male or spigot end member machined to a continuous taper usually 2 degrees, and is commonly pulled into contact by bolts passed through lugs cast on the ends of the connecting members. The difference in degree of machine taper between the spigot and the hub permits flexibility to a certain degree and the metal to metal contact insures tightness and allows the pipe to carry high pressure without leakage. The design and construction, however, of the two members, hub and spigot, commonly used type, is such that the more the spigot is telescoped into the hub end, the tighter the contact, and great pressure is exerted on the hub end in a radial internal direction. This commonly used type of joint is apparently so simple that uninformed or careless users will put the members into too close contact, exerting extraordinary pressure on the hub end, causing it to split, and if the split does not immediately occur in the case of a joint being pulled together too tight, it frequently happens that the split will occur at the advent of warm weather; the increase in temperature causing the pipe to expand, forcing the spigot rapidly into much greater contact with the hub end, thus exerting overwhelming radial pressure on the hub interior and causing the split above mentioned.

It frequently happens also, that due to the continuous taper of the hub and spigot ends that during deflection the spigot extreme end contacts the continuous slope of the hub end with such force as to shear off the spigot end in the form of a ring. It further happens that the spigot extreme end will become chipped or otherwise damaged from handling or shipping, and since the tightness of the joint is dependent on point or extreme end contact on part of the spigot, this damaging of the spigot extreme end, causes leakage mentioned.

These difficulties have been a matter of much concern to users of piping for many years, and the present invention is designed to overcome them.

As shown in the drawings of the improved coupling, particularly in Figures 1ª and 2, the spigot 10 has the straight section 11 or CB and the tapered section 11′ or AB. Referring again to Figure 1ª and Figure 2 the portion of the spigot from B to C is straight or parallel to the horizontal axis or bore of the spigot, and portion from A to B is tapered. Point B is equal to the farthest point of circumference on the spigot machined section.

Referring further to Figures 1ᵃ and 2, the hub 15 has a tapered section 18 or A′B′ and a straight section 16 or C′B′ parallel to the axis or bore of the hub end member. Point B′ in the hub is equal to the point of smallest circumference in the hub end machined section, in this particular case shown. Points A on the spigot, and B′ in the hub, may be of the same circumferential radius from the center line or bore of the pipe. In this case when the spigot 10 is pulled forward into the hub 15, the spigot point A first contacts the hub at or about point B′ in the hub. At this point the members are in contact with little or no pressure being exerted in a radial direction in the hub. It is apparent that the location of these points A on the spigot and B′ in the hub may be slightly varied to take into consideration pressure requirements and the elastic limit of the material of which the pipes are constructed. To make up the joint to its point of permanent tightness, the spigot 10 is pulled or forced into the hub 15 until point B on the spigot is inside the hub and past point B′ in the hub. At this point the joint is fluid tight, due to the increasing diameter or slope of the spigot from A to B, and it is further apparent, that without increasing radial pressure in the hub, the spigot 10 may be pulled or forced still further into the hub, thus avoiding extraordinary pressure in the hub such as would cause splits and breaks in the hub as in the commonly used type. Thus it is further seen that by locating points B and B′ at the proper places, to create a tight leakproof fit between the hub and the spigot, and yet so that when pulled into finished contact, expand the hub within its elastic limit, the point B on the spigot may travel back and forth on the portion 16 of the hub section 15 under any changes of temperature, without affecting the tightness of the joint and without increasing radial pressure in the hub.

In the case of deflection in the members, by referring to Figure 3ᵃ position X, it will be seen that the spigot 10 is in an angular plane with reference to the hub 15, and it will be noted that surface 11 or CB on the spigot is lying along, parallel to and in close contact with surface 18 or A′B′ of the hub 15. It will be noted further that point A on the spigot 10, being the extreme end of the same, is away from and not in contact with any part or point of the hub 15 interior. Referring again to Fig. 3ᵃ, position Y, the opposite position of the members, it will be seen that the tapered section 11′ or AB of the spigot 10 is lying along and in close contact with tapered section 18 or A′B′ of the hub 15. In this, the extreme case, it will be noted that the point A of the spigot does not alone contact the interior of the hub, but that the entire surface 11′ or AB makes the contact.

It will thus be seen that the shearing action on the spigot sometimes prevalent in the unimproved commonly used type with continuous taper, in which the spigot extreme end contacts the interior of the hub, is prevented and avoided. It will be further observed that with this improved type the extreme end of the spigot may be chipped or otherwise damaged, without affecting the tightness of the joint when pulled into either straight or deflected contact.

Figure 4 shows a variation in this improved joint wherein in place of pulling and holding into contact the members with bolts through lugs, see 17, Figure 1, the members consist of an open enlarged hub, and an elongated spigot, the improved machined joint being formed at the farthest interior or base of the hub, and on the end of the spigot. This type of joint is designed to have the members driven into contact by a maul or jack or some suitable means (not shown) and held in contact by suitable packing material such as lead, cement or compound as commonly practised, placed in the annular space in the hub, exterior to the machined joint. Another variation is, as shown, clamp 25 pulled into place by bolt 26 and nut 27, thus holding the members in contact. This design as shown in the drawings, Figure 4 is of particular value where it may be desired to make use of a rough casting such as commonly known as "bell and spigot type", in which the casting can be machine worked to embody it in the present invention. How this may be done is illustrated in Figure 4 of the drawings, wherein the female member or hub 15 will have its interior machined to conform to line 21, and the end of the spigot machined to conform to line 21′, and machined as indicated at 11 and 11′. On the other hand if a plain "Bell and spigot type" of joint is desired, the spigot may be cut off at line 20 indicated in Figure 4.

From the foregoing it will be seen that the invention insures a leak proof joint, one that is highly flexible, one that permits changes of alignment, and changes of position attributable to settling, expansions and contractions due to temperature changes, without in any way impairing the coupling.

It is obvious that the parts of this invention may be otherwise constructed and modified without departing from the essential features above and herein described or from the intended scope of the appended claims.

Having described my invention and set forth its merits, what I claim is:

1. In pipe couplings, the combination of the spigot end of a pipe, having an initial straight section parallel with the bore of the spigot, and a tapered extremity; a hub end of a pipe, having a socket with an initial tapering wall section of a greater degree of deflection than said spigot end, and straight or horizontal wall at the inner end of said tapering socket, the horizontal section being parallel with the bore of the hub end pipe, and adapted to receive the tapered end of the spigot without increasing radial pressure in the hub end.

2. In pipe couplings, a spigot member having externally formed sections parallel and angular to the bore of the spigot, and a hub member having inner sections formed angular and parallel to the bore of the hub, said spigot formed to enter and contact said hub; said angular section of spigot contacting said parallel section of hub, and said parallel section of spigot contacting said angular section of hub.

3. In pipe couplings, the combination of a spigot member having externally formed sections in angular relation to each other, and a hub member having inner sections formed in angular relation to each other, such members formed to telescope one within the other with the angular sections of the one lying along and contacting the parallel section of the other.

4. In pipe couplings, the combination of a bell member, having an initial enlarged annular space formed to receive a clamp or packing, a secondary socket having an initial section inwardly tapered and a final secondary horizontal section; and a spigot member, having an extreme end formed in sections in angular relation to each other, the radial diameter of said extreme end of spigot being formed to directly contact the secondary socket of said bell without the use of packing material.

5. In pipe couplings, the combination of the spigot end of a pipe having a tapered extremity, a bell end of a pipe having a socket with tapering walls of a greater degree of deflection than the said spigot end, and horizontal walls at the inner end of said socket parallel with the bore of the latter pipe and adapted to receive the tapered end of the spigot without increasing pressure on the bell end.

6. In pipe couplings, an outer member having a divergent end section adjacent to a section parallel to the bore of said member, an inner telescoping member having a convergent section and an adjacent section parallel to the bore of said member constructed to form direct contact of said members between the outer member divergent section and the inner member parallel section, and to form a direct contact between the convergent section of the inner member and the parallel section of the outer member, without the use of a packing chamber or material.

7. In pipe couplings, the combination of an outer member with an inwardly tapering extremity section followed by an adjacent non-taper section ending in a vertical section, and an inner member formed with angular sections to contact said outer member in cooperation with integral lugs or flanges on said members and connecting screw bolts.

8. In pipe and fitting couplings, the combination of the spigot end having an initial straight section parallel to the bore of the spigot, and a tapered extremity, a hub end having a socket with an initial tapering wall section of a greater degree of deflection than said spigot end, and straight or horizontal walls adjacent to and at the inner end of said tapering socket, the horizontal section being parallel with the bore of the hub end, and substantially the same radial diameter as the extreme or smaller end of spigot tapered section; the radial diameters of the smaller end of the tapered section of hub, and of the larger end of the tapered section of spigot being of such radial diameter relations as to force the spigot larger end tapered section to tightly contact the hub smaller end tapered section when spigot and hub are coupled; said horizontal section in the hub being of substantially greater length than the tapered section of spigot.

In testimony whereof I affix my signature.

LEONARD W. SAINE.